US012726947B2

(12) United States Patent
Liu et al.

(10) Patent No.: US 12,726,947 B2
(45) Date of Patent: Sep. 1, 2026

(54) USER EQUIPMENT RESOURCE ALLOCATION

(71) Applicant: QUALCOMM Incorporated, San Diego, CA (US)

(72) Inventors: Le Liu, San Jose, CA (US); Qing Li, Princeton Junction, NJ (US); Umesh Phuyal, San Diego, CA (US); Alberto Rico Alvarino, San Diego, CA (US); Vishnu Vardhan Chetlur Ravi, San Diego, CA (US); Stefano Faccin, San Ysidro, CA (US); Harikumar Krishnamurthy, San Diego, CA (US); Kazuki Takeda, Minato-ku (JP); Drew Foster Van Duren, Templeton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 783 days.

(21) Appl. No.: 18/165,764

(22) Filed: Feb. 7, 2023

(65) Prior Publication Data

US 2024/0267890 A1 Aug. 8, 2024

(51) Int. Cl.

| | |
|---|---|
| ***H04W 72/02*** | (2009.01) |
| ***H04W 72/044*** | (2023.01) |
| ***H04W 72/25*** | (2023.01) |
| ***H04W 72/54*** | (2023.01) |
| ***H04W 72/563*** | (2023.01) |

(52) U.S. Cl.
CPC ....... *H04W 72/02* (2013.01); *H04W 72/0473* (2013.01); *H04W 72/25* (2023.01); *H04W 72/54* (2023.01); *H04W 72/563* (2023.01)

(58) Field of Classification Search
CPC ...... H04B 7/18504; H04L 67/12; H04W 4/40; H04W 72/02; H04W 72/0473; H04W 72/25; H04W 72/40; H04W 72/54; H04W 72/563; H04W 76/14; H04W 92/18
See application file for complete search history.

(56) References Cited

U.S. PATENT DOCUMENTS

| | | | |
|---|---|---|---|
| 2021/0400650 A1* | 12/2021 | Shilov | H04W 4/40 |
| 2022/0046698 A1* | 2/2022 | Zhao | H04W 72/1268 |
| 2022/0256318 A1* | 8/2022 | Li | H04W 76/14 |
| 2023/0049307 A1* | 2/2023 | Liu | H04W 72/51 |
| 2024/0237093 A1* | 7/2024 | Chiba | H04W 76/14 |
| 2024/0422806 A1* | 12/2024 | Wu | H04W 72/40 |
| 2025/0142602 A1* | 5/2025 | Han | G08G 5/56 |

* cited by examiner

*Primary Examiner* — Awet Haile
(74) *Attorney, Agent, or Firm* — QUALCOMM Incorporated

(57) ABSTRACT

Various aspects of the present disclosure generally relate to wireless communication. In some aspects, a user equipment (UE) may obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The UE may allocate one or more resources for a sidelink communication to be transmitted by the UE based at least in part on the information. Numerous other aspects are described.

30 Claims, 12 Drawing Sheets

300

USER EQUIPMENT RESOURCE ALLOCATION

FIELD OF THE DISCLOSURE

Aspects of the present disclosure generally relate to wireless communication and to techniques and apparatuses for user equipment resource allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The method may include allocating one or more resources for a sidelink communication to be transmitted by the UE based at least in part on the information.

Some aspects described herein relate to a method of wireless communication performed by a UE. The method may include receiving an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The method may include receiving a sidelink communication via the one or more resources that includes at least one of the first type of communication and the second type of communication.

Some aspects described herein relate to a method of wireless communication performed by a UE. The method may include obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The method may include transmitting a request for one or more resources associated with the first type of communication or the second type of communication.

Some aspects described herein relate to an apparatus for wireless communication at a UE. The apparatus may include a memory and one or more processors coupled to the memory. The one or more processors may be configured to obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The one or more processors may be configured to allocate one or more resources for a sidelink communication to be transmitted by the UE based at least in part on the information.

Some aspects described herein relate to an apparatus for wireless communication at a UE. The apparatus may include a memory and one or more processors coupled to the memory. The one or more processors may be configured to receive an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The one or more processors may be configured to receive a sidelink communication via the one or more resources that includes at least one of the first type of communication and the second type of communication.

Some aspects described herein relate to an apparatus for wireless communication at a UE. The apparatus may include a memory and one or more processors coupled to the memory. The one or more processors may be configured to obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The one or more processors may be configured to transmit a request for one or more resources associated with the first type of communication or the second type of communication.

Some aspects described herein relate to a non-transitory computer-readable medium that stores a set of instructions for wireless communication by a UE. The set of instructions, when executed by one or more processors of the UE, may cause the UE to obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The set of instructions, when executed by one or more processors of the UE, may cause the UE to allocate one or more resources for a sidelink communication to be transmitted by the UE based at least in part on the Some aspects described herein relate to a non-transitory computer-readable medium that stores a set of instructions for wireless communication by a UE. The set of instructions, when executed by one or more processors of the UE, may cause the UE to receive an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The set of instructions, when executed by one or more processors of the UE, may cause the UE to receive a sidelink communication via the one or more resources that includes at least one of the first type of communication and the second type of communication.

Some aspects described herein relate to a non-transitory computer-readable medium that stores a set of instructions for wireless communication by a UE. The set of instructions, when executed by one or more processors of the UE, may cause the UE to obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The set of instructions, when executed by one or more processors of the UE, may cause the UE to transmit a request for one or more resources associated with the first type of communication or the second type of communication.

Some aspects described herein relate to an apparatus for wireless communication. The apparatus may include means for obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The apparatus may include means for allocating one or more resources for a sidelink communication based at least in part on the information.

Some aspects described herein relate to an apparatus for wireless communication. The apparatus may include means for receiving an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The apparatus may include means for receiving a sidelink communication via the one or more resources that includes at least one of the first type of communication and the second type of communication.

Some aspects described herein relate to an apparatus for wireless communication. The apparatus may include means for obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The apparatus may include means for transmitting a request for one or more resources associated with the first type of communication or the second type of communication.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
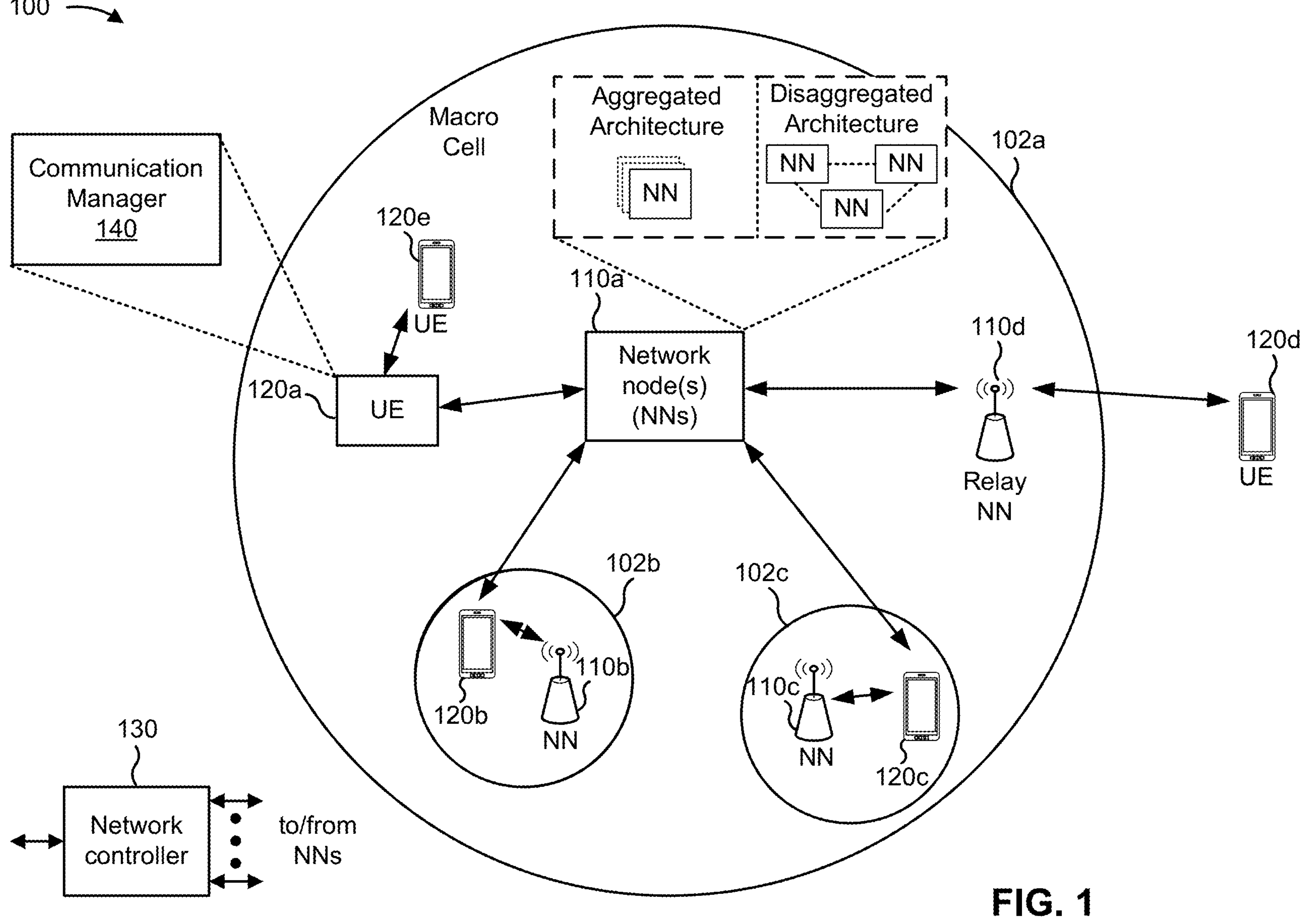
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrow band IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and allocate one or more resources for a sidelink communication to be transmitted by the UE based at least in part on the information. Additionally, or alternatively, the communication manager 140 may perform one or more other operations described herein.

In some aspects, the communication manager 140 may receive an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and receive a sidelink communication via the one or more resources that includes at least one of the first type of communication and the second type of communication. Additionally, or alternatively, the communication manager 140 may perform one or more other operations described herein.

In some aspects, the communication manager 140 may obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and transmit a request for one or more resources associated with the first type of communication or the second type of communication. Additionally, or alternatively, the communication manager 140 may perform one or more other operations described herein.

As indicated above, FIG. 1 is provided as an example. Other examples may differ from what is described with regard to FIG. 1.

Figure 2:
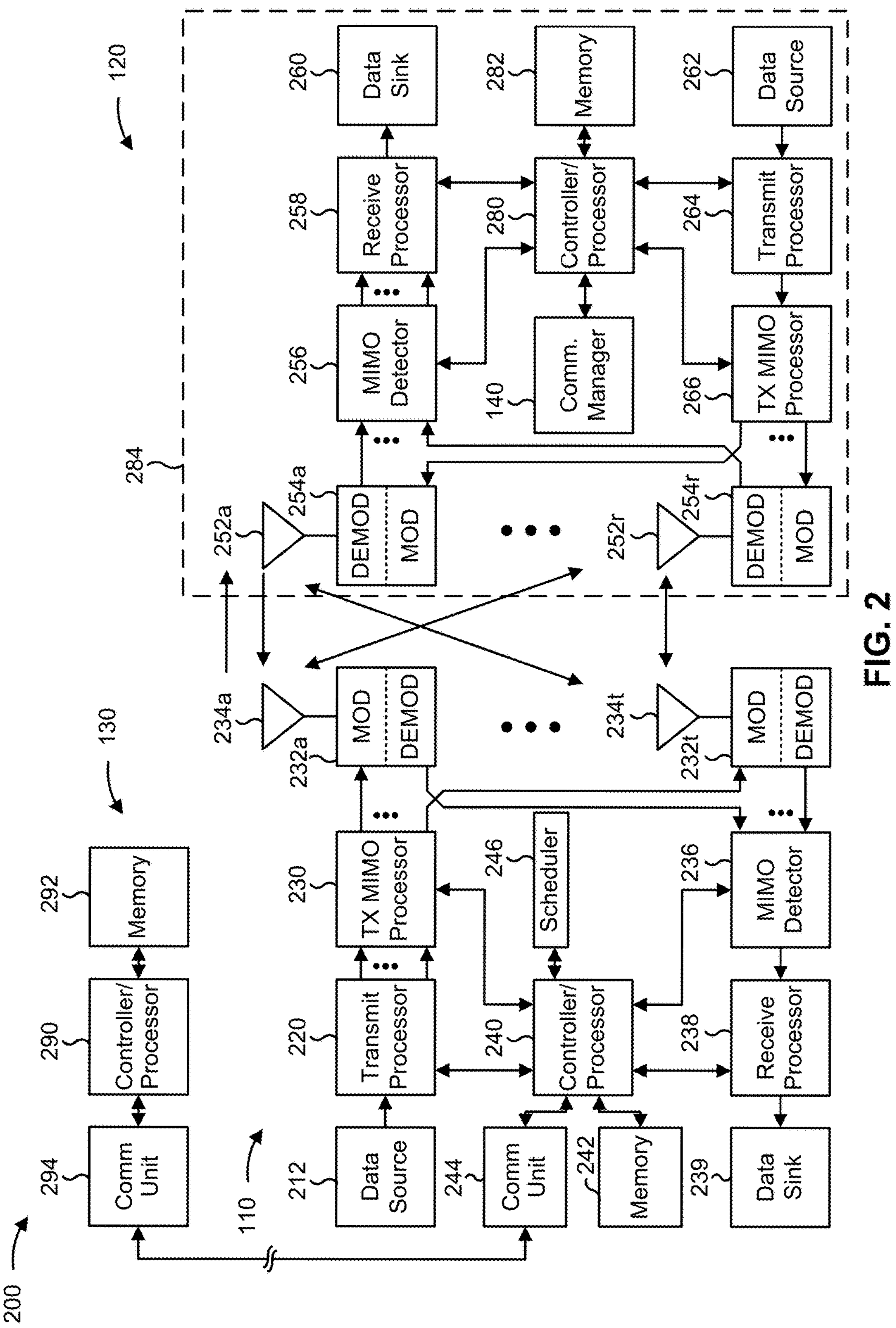
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller

130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with UE resource allocation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and/or means for allocating one or more resources for a sidelink communication to be transmitted by the UE based at least in part on the information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and/or means for receiving a sidelink communication via the one or more resources that includes at least one of the first type of communication and the second type of communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and/or means for transmitting a request for one or more resources associated with the first type of communication or the second type of communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
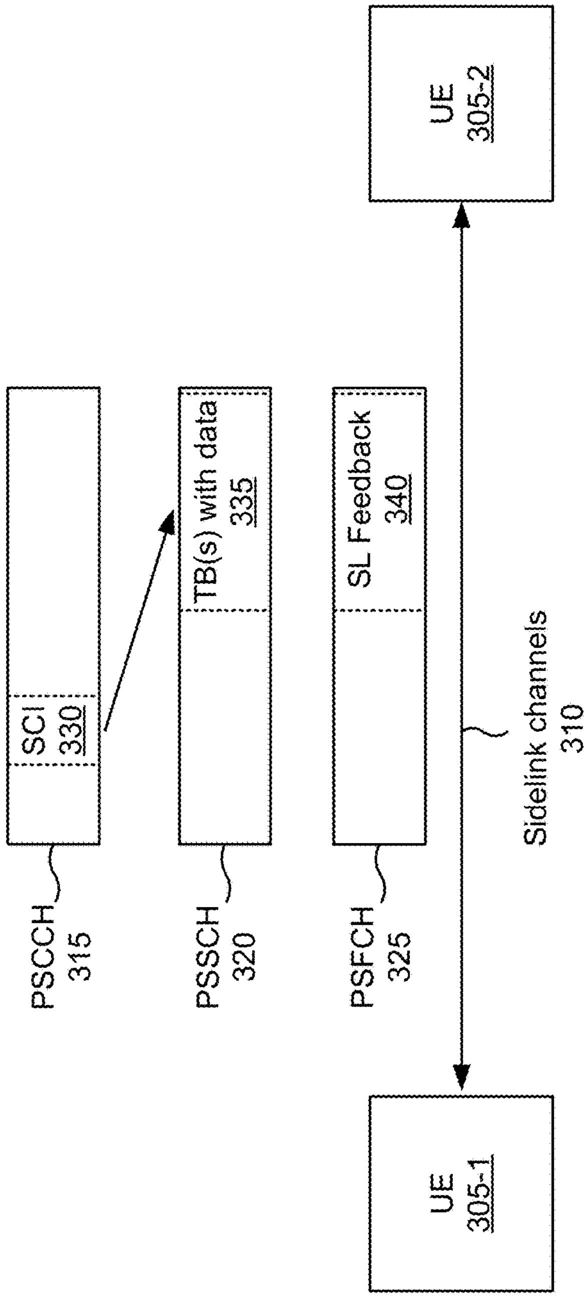
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
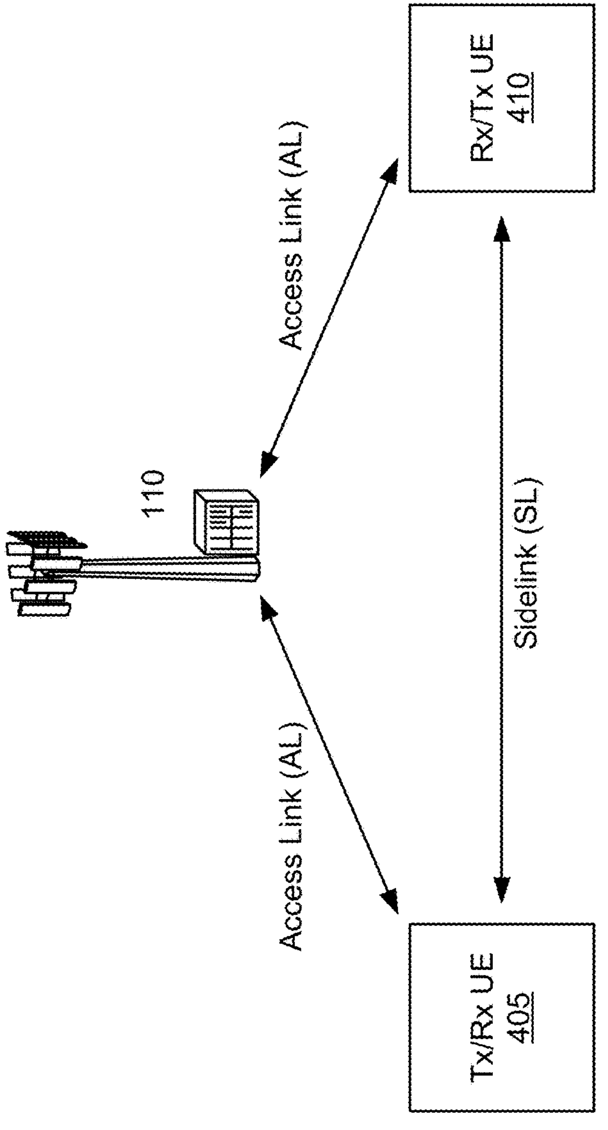
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5A:
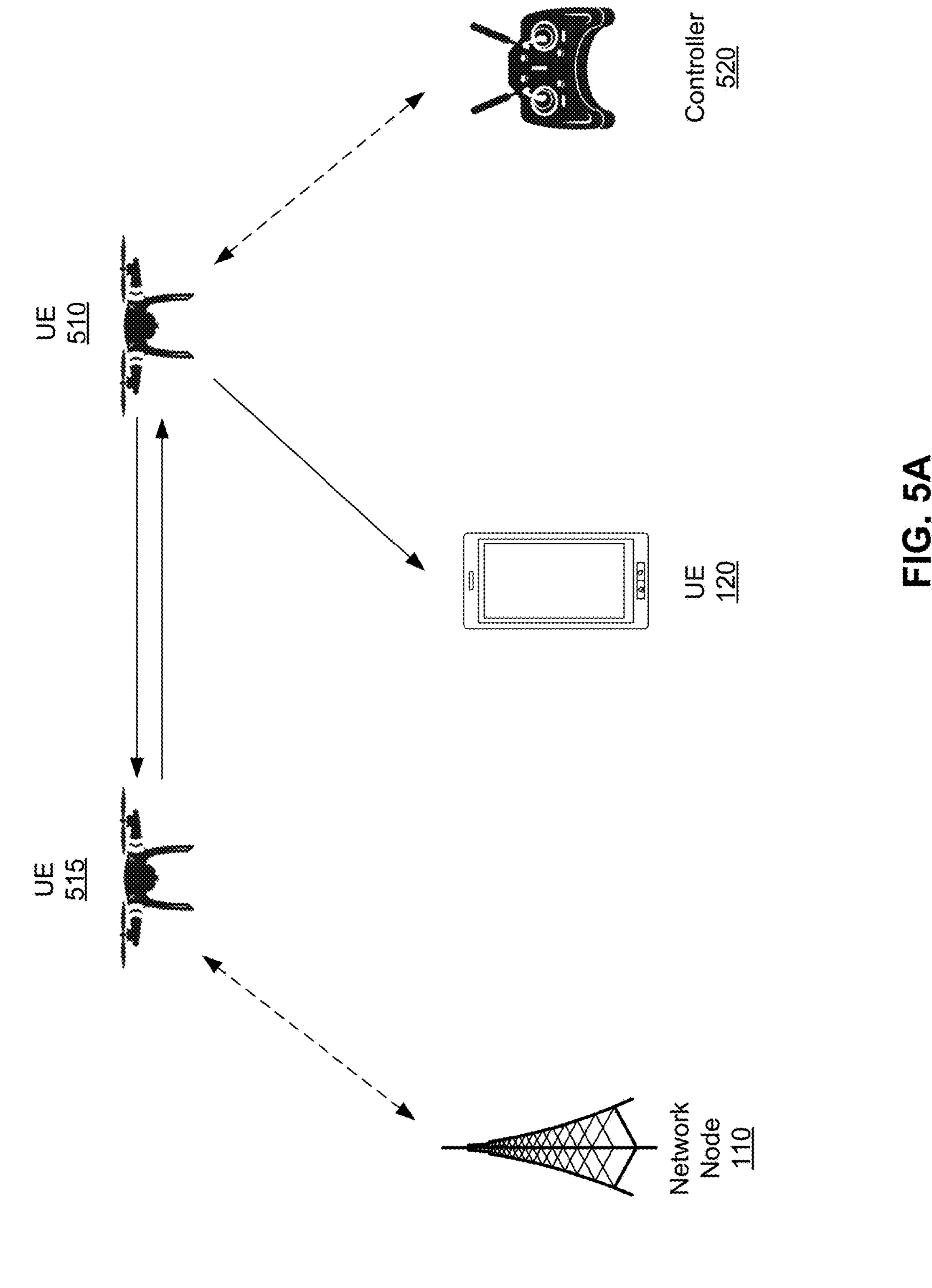
FIGS. 5A-5B are diagrams illustrating examples of UE communications and interference, in accordance with the present disclosure.
Figure 5B:
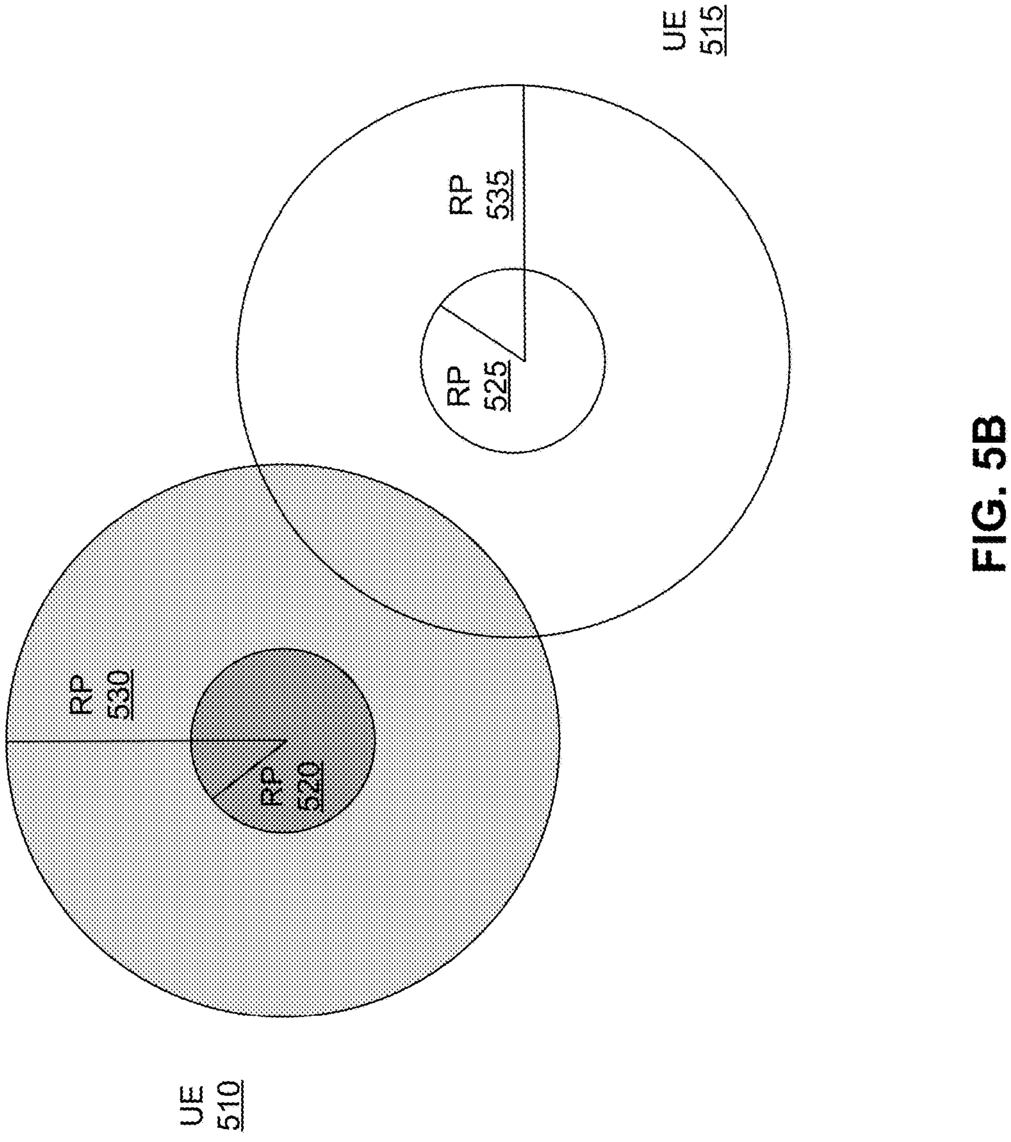

FIGS. 5A-5B are diagrams illustrating examples of UE communications and interference, in accordance with the present disclosure. As shown in FIG. 5A and example 500, UE 510 may communicate with UE 515. The UE 510 and/or the UE 515 may be an aerial UE (AUE), such as an unmanned aerial vehicle (UAV). The UE 510 may communicate with the UE 120 and/or a controller 520. The UE 120 may be a terrestrial UE, such as a cellular telephone. The controller 520 may control movement and/or other functions of the UE 510 via one or more control signals. The UE 515 may communicate with the network node 110.

In some cases, the UE 510 (and/or the UE 515) may transmit a detect and avoid (DAA) signal, such as a short-range detect and avoid signal. The UE 510 may transmit the DAA via a broadcast transmission. In some other cases, the UE 510 may transmit the DAA to another UE via a unicast transmission. The DAA transmission may be a user-to-everything (U2X) transmission. The DAA may be used for proximate communications and may have a small periodicity. For example, the DAA may be used for communications less than 1 kilometer (1 km) and may have a periodicity that is less than 100 milliseconds (100 ms). The DAA may be used, for example, to broadcast mobility information associated with the UE 510 and for detecting other devices in the air to avoid physical contact. The DAA may be similar to basic safety messages used in vehicle-to-vehicle (V2V) communications, and may include information such as position and/or direction of the UE 510.

In some cases, the UE 510 (and/or the UE 515) may transmit a broadcast remote identifier (BRID). The UE 510 may transmit the BRID via a broadcast transmission. The BRID transmission may be a U2X transmission. The BRID may be used for longer range communications and may have a larger periodicity. The BRID may be regarded as long-range detect and avoid signal. For example, the BRID may be used for communications greater than 1 km and may have a periodicity that is greater than 100 ms. The BRID may be used, for example, to broadcast a remote identifier and/or location information associated with the UE 510 to law enforcement officers and to other agencies on the ground (such as the UE 120).

In some cases, a UE transmitting a BRID may be sensitive to interference resulting from another UE transmitting a DAA. In some cases, a UE transmitting a DAA may not require as high of a transmit power (e.g., may not require a maximum transmit power) as a UE transmitting a BRID. For example, ninety five percent of UEs transmitting a DAA can avoid collision within 750 meters by using a lower maximum transmit power.

As shown in FIG. 5B and example 505, a resource pool (RP) for a DAA may only require a small broadcast range, may use a low transmit power, and may not require any specific interference coordination between the UEs or network nodes. In contrast, an RP for a BRID may require a larger broadcast range, may use a higher transmit power, and may require interference coordination between the UEs or network nodes. For example, RP 520 associated with a DAA for the UE 510 may not overlap with RP 525 associated with a DAA for the UE 515. Thus, interference coordination between UE 510 and UE 515 may not be needed for DAA transmissions. However, RP 530 associated with a BRID for the UE 510 may overlap with RP 535 associated with a BRID for the UE 515. Thus, interference coordination between UE 510 and UE 515 may be needed for BRID transmissions.

NR sidelink may allow for two resource allocation modes. In Mode 1, a network node may allocate resources for sidelink communications between UEs. In Mode 2, the UEs may autonomously select the sidelink resources. In some cases, a UE may be provided with a sidelink resource pool configuration. In the frequency domain, the UE may be provided with a bandwidth part (BWP) for sidelink transmissions using a sidelink bandwidth park configuration (SL-BWP-Config) parameter. Within the SL BWP, the UE may be configured by higher layers with our or more resource pools. However, in some cases, only one resource pool may be active at a single time. For each transmission or reception resource pool, sidelink time and frequency resources, as well as power control, may be configured independently. An example of a SL-BWP-Config is shown below:

```
SL-BWP-Config-r16 ::=                SEQUENCE {
  sl-BWP-Id                          BWP-Id,
  sl-BWP-Generic-r16                     SL-BWP-Generic-
r16                         OPTIONAL,    -- Need M
  sl-BWP-PoolConfig-r16                    SL-BWP-PoolConfig-
r16                       OPTIONAL,    -- Need M
  ...,
}
SL-BWP-PoolConfig-r16 ::=            SEQUENCE {
  sl-RxPool-r16                    SEQUENCE (SIZE (1..maxNrofRXPool-r16)) OF SL-
ResourcePool-r16          OPTIONAL,    -- Cond HO
  sl-TxPoolSelectedNormal-r16              SL-TxPoolDedicated-
r16                             OPTIONAL,    -- Need M
  sl-TxPoolScheduling-r16                SL-TxPoolDedicated-
r16                             OPTIONAL,    -- Need N
  sl-TxPoolExceptional-r16               SL-ResourcePoolConfig-
r16                           OPTIONAL     -- Need M
}
SL-ResourcePool-r16 ::=              SEQUENCE {
  ...
  sl-SubchannelSize-r16            ENUMERATED {n10, n12, n15, n20, n25, n50, n75,
n100}   OPTIONAL,    -- Need M
  dummy                       INTEGER (10..160)          OPTIONAL,    --
Need M
  sl-StartRB-Subchannel-
r16    INTEGER (0..265)                              OPTIONAL,    -- Need M
  ...
  sl-PowerControl-r16              SL-PowerControl-
r16                         OPTIONAL,    -- Need M
  sl-TimeResource-
r16    BIT STRING (SIZE (10..160))                      OPTIONAL    -- Need M
```

In some cases, for a UE transmitting a PSCCH carrying first stage sidelink control information (SCI-1) (such as SCI-1-A), a resource allocation may include, for example:

Priority—3 bits (e.g., as specified in clause 5.4.3.3 of [12, TS 23.287]);

Resource reservation period for periodic traffic; and

Second stage SCI formats.

In some cases, for a UE transmitting a PSSCH carrying second stage sidelink control information (SCI-2), a resource allocation may include, for example:

Source ID, 8 bits;

Destination ID, 16 bits;

HARQ ID/NDI for HARQ-based retransmission;

RV-ID, 2 bits;

HARQ enable/disable, 1 bit;

SCI 2-A only fields:

Cast type, 2 bits, broadcast, groupcast with A/N or N only (unicast), and

CSI request, 1 bit;

SCI 2-B only fields (NACK-only groupcast):

Zone ID, 12 bits, and

Communication range, 4 bits.

In some cases, the DAA and the BRID may have different requirements in terms of periodicity, latency, and broadcast range, among other examples. However, sidelink (PC5) messages do not have the resource allocation for different message types that allow for different periodicities, latencies, and broadcast ranges. Thus, a UE may not be able to allocate different resources for DAA and BRID transmissions, particularly when DAA and BRID have the same cast type of 'broadcast'. Additionally, the UE may not be able to request different resources separately for DAA and BRID transmissions. In some cases, legacy sidelink resource allocation may allow for different cast types and priorities associated with a PC5 quality of service indicator (PQI). However, legacy sidelink resource allocation may not allow for different QoS flows or traffic types with requirements for different communication ranges for interference coordination.

Techniques and apparatuses are described herein for UE resource allocation. In some aspects, a UE (such as a UAV) may obtain information associated with a first type of communication and a second type of communication. The first type of communication may have a range requirement that satisfies a range requirement threshold and/or may have a periodicity that satisfies a periodicity threshold. For example, the first type of communication may have a range requirement that is greater than, or greater than or equal to, 1 km, and may have a periodicity that is greater than, or greater than or equal to, 100 ms. The second type of communication may have a range requirement that does not satisfy the range requirement threshold and/or may have a periodicity that does not satisfy the periodicity threshold. For example, the second type of communication may have a range requirement that is less than, or less than or equal to, 1 km, and may have a periodicity that is less than, or less than or equal to, 100 ms. In some aspects, the first communication may be a BRID and the second communication may be a DAA. The UE may allocate one or more resources for a sidelink communication to be transmitted by the UE based at least in part on the information. For example, the UE may allocate a first set of resources based at least in part on the sidelink communication being a BRID and/or may allocate a second set of resources based at least in part on the sidelink communication being a DAA. In some aspects, a UE may obtain the information associated with the first type of communication and the second type of communication, any may transmit a request for one or more resources associated with the first type of communication or the second type of communication. For example, the UE may request a first set of resources for a BRID and/or may request a second set of resources for a DAA.

In some aspects, the term BRID may refer to any one of a BRID transmission, an electronic conspicuity transmission, a long-range DAA transmission, or a surveillance transmission, and the term DAA may refer to a short-range DAA transmission. Besides the long-range or short-range DAA, there may be other types of DAA with different QoS requirement. Additional details are described herein.

As indicated above, FIGS. 5A-5B are provided as examples. Other examples may differ from what is described with respect to FIGS. 5A-5B.

Figure 6:
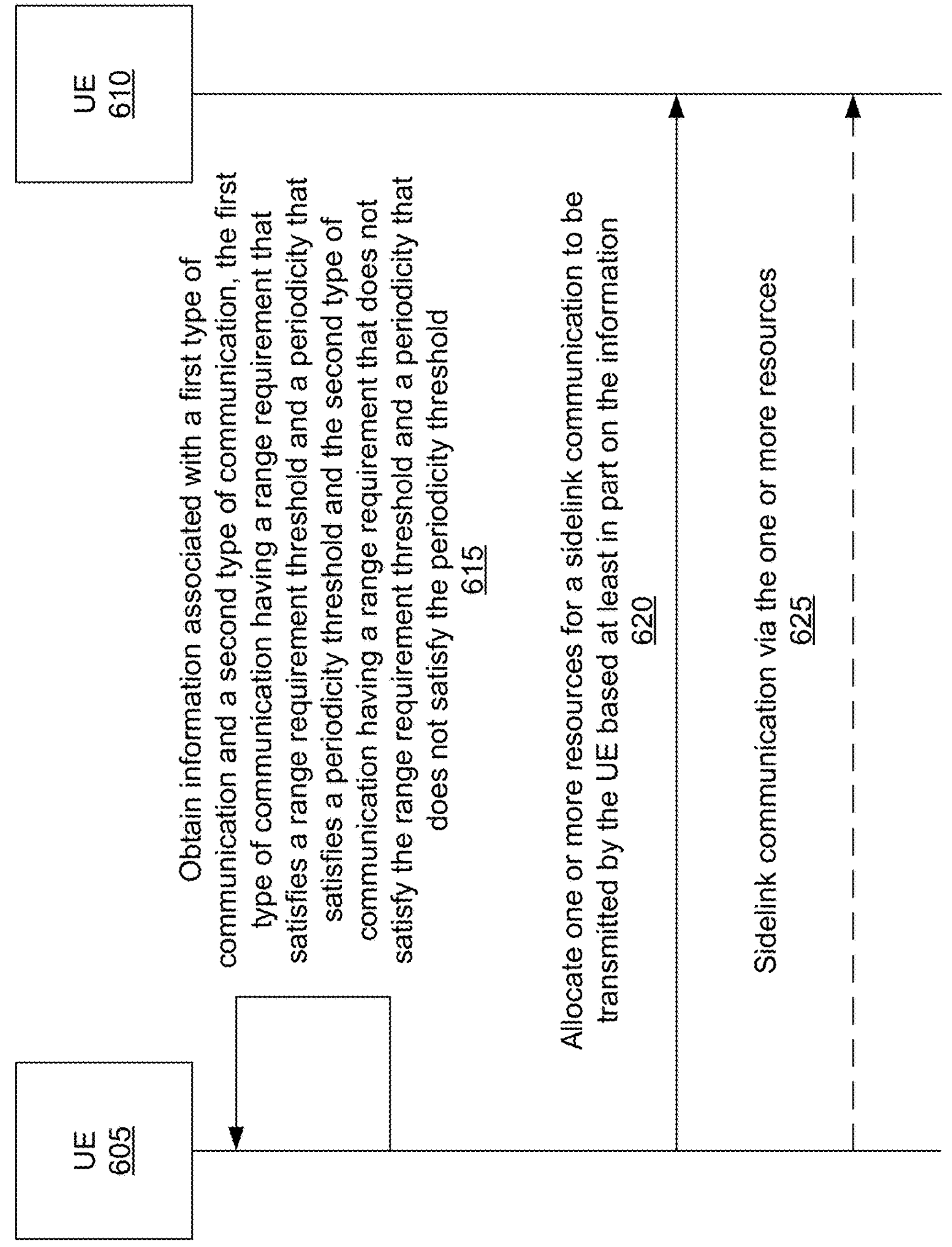
FIG. 6 is a diagram illustrating an example of UE resource allocation, in accordance with the present disclosure.

FIG. 6 is a diagram illustrating an example 600 of user equipment resource allocation, in accordance with the present disclosure. A UE 605 may communicate with a UE 610. In some aspects, at least one of the UE 605 or the UE 610 may be an aerial UE such as a UAV.

As shown by reference number 615, the UE 605 may obtain information associated with a first type of communication and a second type of communication. The first type of communication may have a range requirement that satisfies a range requirement threshold and/or may have a periodicity that satisfies a periodicity threshold. For example, the first type of communication may have a range requirement that is greater than, or greater than or equal to, 1 km, and/or may have a periodicity that is greater than, or greater than or equal to, 100 ms. The second type of communication may have a range requirement that does not satisfy the range requirement threshold and/or may have a periodicity that does not satisfy the periodicity threshold. For example, the second type of communication may have a range requirement that is less than, or less than or equal to, 1 km, and/or may have a periodicity that is less than, or less than or equal to, 100 ms. In some aspects, the first type of communication may be a BRID transmission, an electronic conspicuity transmission, a long-range DAA transmission, or a surveillance transmission, and the second type of communication may be a short-range DAA transmission.

As shown by reference number 620, the UE 605 may allocate one or more resources for a sidelink communication to be transmitted by the UE 605 based at least in part on the information.

In a first example, the UE 605 may semi-statically allocate different resource pools for BRID and DAA. The different resource pools may have different configurations. For example, a first resource pool for BRID transmissions may be associated with a first resource configuration having a first QoS flow criterion, a first transmit power criterion, a first interference coordination criterion, a first power control criterion, and/or a first resource selection criterion, and a second resource pool for DAA transmissions may be associated with a second resource configuration having a second QoS flow criterion, a second transmit power criterion, a second interference coordination criterion, a second power control criterion, and/or a second resource selection criterion. In some aspects, the UE 605 may need to determine whether a packet triggering resource pool selection is for a BRID or a DAA. This may enable the UE 605 to select a resource pool accordingly before performing a resource selection with the selected resource pool explicated. In some aspects, the UE 605 may indicate the resource pool for BRID or DAA via an RRC message. In some aspects, the UE 605 may be preconfigured with the resource pool for BRID or DAA.

In some aspects, the different resource pools may be indicated in a dedicated field. For example, a dedicated (e.g., new) RRC field may be defined to indicate whether a resource pool is for BRID or DAA transmissions. In some aspects, different QoS profiles/flows can be indicated in a sidelink resource pool (SL-ResourcePool), where different QoS profiles/flows (such as different PQIs) are defined for BRID and DAA. For example, PQI=56 or Y can be used to indicate DAA, and PQI=59 or X can be used to indicate BRID. For BRID or DAA, the range requirement may be (pre)configured as SL-Range within the SL-QoS-Profile. An example is shown below and in Table 1:

```
SL-ResourcePool-r16 ::=            SEQUENCE {
  ...
  sl-PowerControl-r16              SL-PowerControl-
r16                         OPTIONAL,    -- Need M
  sl-TimeResource-
r16    BIT STRING (SIZE (10..160))                OPTIONAL    -- Need M
  sl-QoS-Profile                SL-QoS-Profile-r16              OPTIONAL    --
Need M
  ...
}
SL-QoS-Profile-r16 ::=            SEQUENCE {
  sl-PQI-r16                 SL-PQI-r16                      OPTIONAL,    --
Need R
  sl-GFBR-
r16    INTEGER (0..4000000000)                      OPTIONAL,    --
Need R
  sl-MFBR-
r16    INTEGER (0..4000000000)                      OPTIONAL,    --
Need R
  sl-Range-
r16    INTEGER (1..1000)                            OPTIONAL,    -- Need R
  ...
}
SL-QoS-Info-r16 ::=                SEQUENCE {
  sl-QoS-FlowIdentity-r16            SL-QoS-FlowIdentity-r16,
  sl-QoS-Profile-r16                SL-QoS-Profile-r16          OPTIONAL
}
```

TABLE 1

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 56 | Non-GBR | 6 | 20 ms | $10^{-1}$ | N/A | N/A | Platooning informative exchange - low degree of automation; Platooning - information sharing with RSU |
| 59 | | 6 | 500 ms | $10^{-1}$ | N/A | N/A | Platooning - reporting to an RSU |
| X | | [6] | [500 ms] | $10^{-1}$ | N/A | N/A | BRID for UAV in the air |
| Y | | [5] | [50 ms] | $10^{-1}$ | N/A | N/A | DAA for UAV in the air |

In a second example, the UE 605 may dynamically allocate resources for BRID and DAA in a shared resource pool. In some aspects, the UE 605 may need to determine if a packet triggering a resource selection is for a BRID or a DAA. This may enable the UE 605 to select resources accordingly, for example, based at least in part on a traffic pattern, a priority, or a packet delay budget, among other examples. In some aspects, a transmit power may be determined based at least in part on a priority level of the PSSCH transmission and/or a channel busy ratio (CBR) range requirement that includes a CBR measured in a slot (such as slot i−N, as indicated in TS 38.214).

In some aspects, the UE 605 may use SCI-1 to indicate the resource allocation for BRID and DAA. In some aspects, the UE 605 may use a priority parameter in the SCI-1 and may use different priority levels associated with PQIs for BRID and DAA. An example of this resource allocation is shown in Table 1.

In some aspects, the UE 605 may use a resource reservation period parameter in the SCI-1 and may use different resource reservation period values for BRID and DAA. For example, the UE 605 may indicate Is for BRID and 20-100 ms for DAA, which may be (pre)configured in the associated PQI.

In some aspects, the UE 605 may use an SCI-2 format in the SCI-1 and may use different SCI-2 formats for BRID and DAA. For example, as shown in Table 2, SCI-2 formats for BRID and DAA may be defined. An SCI-2-A format (for no feedback or broadcast, or feedback for unicast, or groupcast with ACK/NACK or NACK-only) may be defined for DAA (if indicated by a UAV). An SCI-2-B format may be defined for not feedback for broadcast, or NACK-only for groupcast. An SCI-2-C format may be defined for Release 17 unicast inter-UE coordination. An SCI-2-D format (for broadcast) may be defined for BRID (if indicated by a UAV).

TABLE 2

| Value of SCI-2 Format Field | SCI-2 Format |
|---|---|
| 00 | SCI Format 2-A |
| 01 | SCI Format 2-B |
| 10 | SCI Format 2-C |
| 11 | SCI Format 2-D |

In some aspects, the UE 605 may use SCI-2 to indicate the resource allocation for BRID and DAA. In some aspects, the UE 605 may use a cast type indicator parameter in the SCI-2 and may use different cast types for BRID and DAA. For example, a legacy broadcast cast type may be used for DAA, and a broadcast2 cast type may be used for BRID (e.g., if the transmitter UE is a UAV). An example is shown in Table 3.

TABLE 3

| Value of Cast Type Indicator | Cast Type |
|---|---|
| 00 | Broadcast or broadcast for UAV DAA |
| 01 | Groupcast when HARQ-ACK information includes ACK or NACK |
| 10 | Unicast |
| 11 | Groupcast when HARQ-ACK information includes only NACK or broadcast2 for UAV BRID |

In some aspects, the UE 605 may use a destination ID parameter in the SCI-2 and may use different common destination IDs for BRID and DAA. For example, sl-DestinationIdentity=XXXX may be used for DAA, and sl-DestinationIdentity=YYYY may be used for BRID.

In some aspects, the UE 605 may use a dedicated field associated with QoS information and may use different QoS profiles/flows for BRID and DAA. For example, different SL-PQFI indicators in a SL-QoS-FlowIdentity parameter may be used to indicate BRID or DAA. In another example, different sl-PQI indicators in a QoS profile may be used to indicate BRID or DAA (e.g., PQI=56 or Y can be used to indicate DAA, and PQI=59 or X can be used to indicate BRID, as shown in Table 1). In another example, different SL-Range indicators in a SL-QoS-profile parameter may be used to indicate BRID or DAA.

As shown by reference number 625, the UE 605 may transmit, and the UE 610 may receive, a sidelink communication via the one or more resources. The UE 605 may transmit the sidelink communication via a first set of resources based at least in part on the sidelink communication being a BRID, or may transmit the sidelink communication via a second set of resources based at least in part on the sidelink communication being a DAA. The UE 610 may be configured to monitor the one or more resources based at least in part on the resource allocation information received from the UE 605.

As indicated above, FIG. 6 is provided as an example. Other examples may differ from what is described with respect to FIG. 6.

For legacy sidelink resource requests, a UE can set a sl-CastType parameter to the cast type of the associated destination identity for which to request the resource. Additionally, the UE may set a sl-QoS-InfoList parameter to include QoS profile(s) of the sidelink QoS flow(s) of the associated destination. An example is shown below.

```
SL-TxResourceReq-r16 ::=                SEQUENCE {
  sl-DestinationIdentity-r16            SL-DestinationIdentity-r16,
  sl-CastType-r16                   ENUMERATED {broadcast, groupcast, unicast,
spare1},
  sl-RLC-ModeIndicationList-r16           SEQUENCE (SIZE (1..maxNrofSLRB-
r16)) OF SL-RLC-ModeIndication-r16           OPTIONAL,
  sl-QoS-InfoList-r16                   SEQUENCE (SIZE (1..maxNrofSL-QFIsPerDest-
r16)) OF SL-QoS-Info-r16          OPTIONAL,
  sl-TypeTxSyncList-r16                 SEQUENCE (SIZE (1..maxNrofFreqSL-
r16)) OF SL-TypeTxSync-r16               OPTIONAL,
  sl-TxInterestedFreqList-r16           SL-TxInterestedFreqList-
r16                                 OPTIONAL,
  sl-CapabilityInformationSidelink-
r16    OCTET STRING                             OPTIONAL
}
```

In some cases, legacy sidelink resource allocation may allow for different cast types and priorities associated with a PQI. However, legacy sidelink resource allocation may not allow for different QoS flows or traffic types with requirements for different communication ranges for interference coordination.

Figure 7:
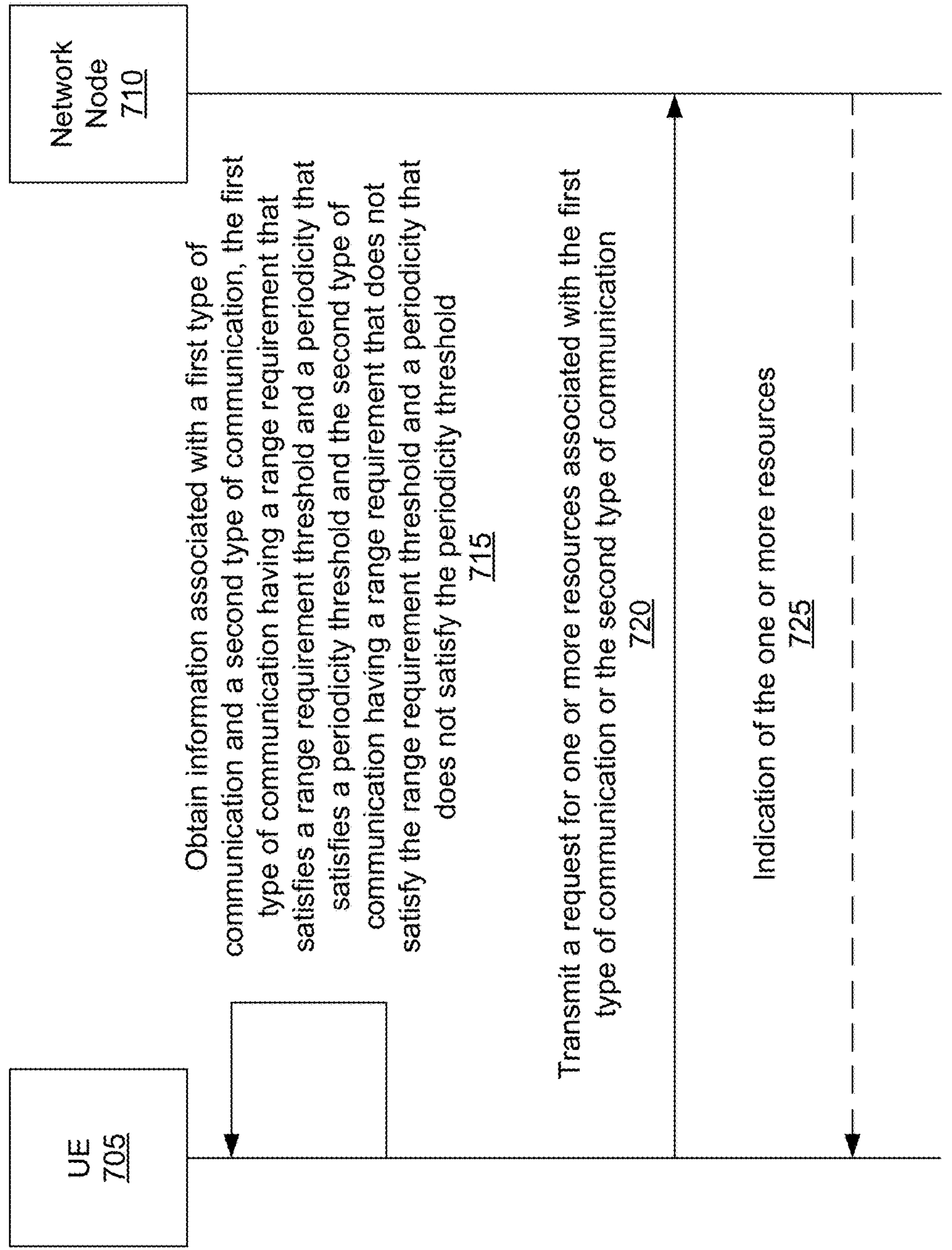
FIG. 7 is a diagram illustrating an example of a sidelink resource request, in accordance with the present disclosure.

FIG. 7 is a diagram illustrating an example 700 of a sidelink resource request, in accordance with the present disclosure. A UE 705 may communicate with a network node 710. In some aspects, the UE 705 may be an aerial UE such as a UAV.

As shown by reference number 715, the UE 705 may obtain information associated with a first type of communication and a second type of communication. The first type of communication may have a range requirement that satisfies a range requirement threshold and/or may have a periodicity that satisfies a periodicity threshold. For example, the first type of communication may have a range requirement that is greater than, or greater than or equal to, 1 km, and/or may have a periodicity that is greater than, or greater than or equal to, 100 ms. The second type of communication may have a range requirement that does not satisfy the range requirement threshold and/or may have a periodicity that does not satisfy the periodicity threshold. For example, the second type of communication may have a range requirement that is less than, or less than or equal to, 1 km, and/or may have a periodicity that is less than, or less than or equal to, 100 ms. In some aspects, the first type of communication may be a BRID transmission, an electronic conspicuity transmission, a long-range DAA transmission, or a surveillance transmission, and the second type of communication may be a short-range DAA transmission.

As shown by reference number 720, the UE 705 may request one or more resources for a sidelink communication to be transmitted by the UE 705 based at least in part on the information. In some aspects, the UE 705 may request the one or more resources using a SL-TxResourceReq parameter. In some aspects, the UE 705 may use a sl-CastType parameter to indicate different traffic types. For example, a broadcast2 indicator may be used to indicate a BRID.

```
sl-CastType-r16       ENUMERATED {broadcast, groupcast, unicast,
spare1broadcast2}
```

In some aspects, the UE 705 may use a sl-QoS-InfoList parameter that includes a QoS profile/flow indicator that is defined for BRID and DAA. For example, different SL-PQFI indicators may be used in the SL-QoS-FlowIdentity parameter to indicate BRID or DAA, different sl-PQI indicators may be used in the QoS profile parameter to indicate BRID or DAA (e.g., PQI=56 or Y can be used to indicate DAA, and PQI=59 or X can be used to indicate BRID), and/or different SL-Range indicators may be used as the range requirement in the SL-QoS-Profile parameter to indicate BRID or DAA.

```
sl-QoS-InfoList-r16                SEQUENCE (SIZE (1..maxNrofSL-QFIsPerDest-
r16)) OF SL-QoS-Info-r16              OPTIONAL
  SL-QoS-Info-r16 ::=                    SEQUENCE {
    sl-QoS-FlowIdentity-r16                SL-QoS-FlowIdentity-r16,
    sl-QoS-Profile-r16                   SL-QoS-Profile-
  r16                              OPTIONAL
```

In some aspects, the UE 705 may use a SL-Destination-Identity parameter to indicate BRID or DAA. For example, sl-DestinationIdentity=XXXX may be used for DAA, and sl-DestinationIdentity=YYYY may be used for BRID.

In some aspects, the UE 705 may use a dedicated (e.g., new) RRC parameter to indicate BRID or DAA. For example, a sl-TrafficType parameter may indicate BRID or DAA.

| sl-TrafficType | ENUMERATED {BRID, DAA} |
|---|---|

In some aspects, the UE 705 may request one or more resources for a configured grant, for example, using a SL-UE-AssistanceInformationNR parameter.

```
SL-UE-AssistanceInformationNR-r16
::= SEQUENCE (SIZE (1..maxNrofTrafficPattern-r16)) OF SL-TrafficPatternInfo-r16
SL-TrafficPatternInfo-r16 ::=        SEQUENCE {
  trafficPeriodicity-r16          ENUMERATED {ms20, ms50, ms100, ms200, ms300,
ms400, ms500, ms600, ms700, ms800, ms900, ms1000},
  timingOffset-r16                INTEGER (0..10239),
  messageSize-r16                    BIT STRING (SIZE (8)),
  sl-QoS-FlowIdentity-r16              SL-QoS-FlowIdentity-r16
}
```

In some aspects, the UE 705 may use a SL-QoS-Flow Identity parameter to indicate different traffic types for the configured grant. The SL-QoS-FlowIdentity parameter may identify a sidelink QoS flow between the UE 705 and the network node 710 in the scope of UE 705, which may be unique for different destination and cast types. For example, an SL-PQFI indicator in the SL-QoS-FlowIdentity parameter may be used to indicate BRID or DAA. In another example, SL-PQFI may be associated with SL-PQI or SL-Range indicators as the range requirement in SL-QoS-profile parameter to differentiate between BRID and DAA.

In some aspects, the UE 705 may use a dedicated (e.g., new) RRC parameter to indicate BRID or DAA. For example, a sl-TrafficType parameter may indicate BRID or DAA.

As shown by reference number 725, the network node 710 may transmit, and the UE 705 may receive, an indication of the one or more resources. For example, the network node 710 may transmit an indication of a first set of resources to be used for BRID transmissions and/or may transmit an indication of a second set of resources to be used for DAA transmissions.

As indicated above, FIG. 7 is provided as an example. Other examples may differ from what is described with respect to FIG. 7.

Figure 8:
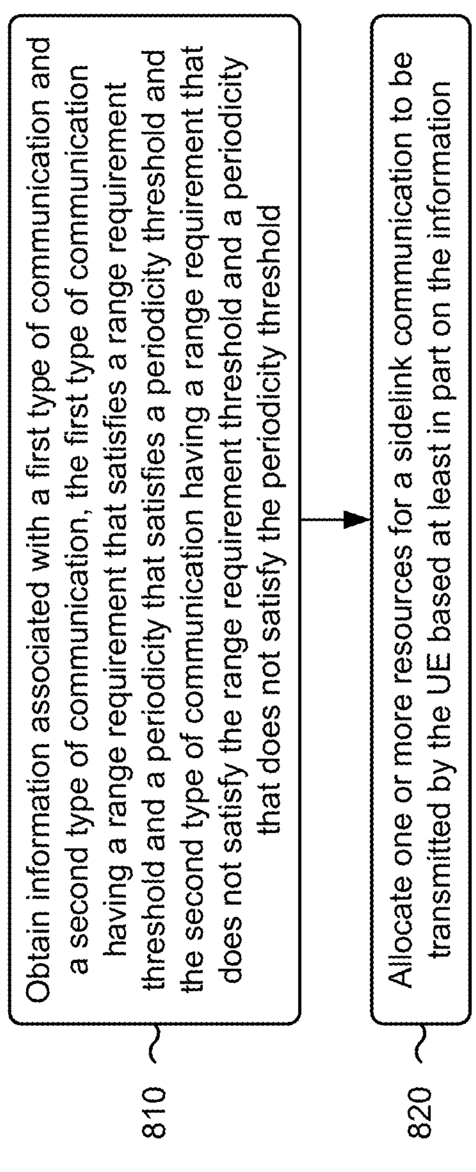
FIG. 8 is a diagram illustrating an example process performed, for example, by a UE, in accordance with the present disclosure.
Figure 8:

FIG. 8 is a diagram illustrating an example process 800 performed, for example, by a UE, in accordance with the present disclosure. Example process 800 is an example where the UE (e.g., UE 120) performs operations associated with user equipment resource allocation.

As shown in FIG. 8, in some aspects, process 800 may include obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold (block 810). For example, the UE (e.g., using reception component 1102 and/or communication manager 1106, depicted in FIG. 11) may obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold, as described above.

As further shown in FIG. 8, in some aspects, process 800 may include allocating one or more resources for a sidelink communication to be transmitted by the UE based at least in part on the information (block 820). For example, the UE (e.g., using communication manager 1106, depicted in FIG. 11) may allocate one or more resources for a sidelink communication to be transmitted by the UE based at least in part on the information, as described above.

Process 800 may include additional aspects, such as any single aspect or any combination of aspects described below and/or in connection with one or more other processes described elsewhere herein.

In a first aspect, the UE is an unmanned aerial vehicle.

In a second aspect, alone or in combination with the first aspect, the first type of communication is a broadcast remote identifier transmission, an electronic conspicuity transmission, a long-range detect and avoid transmission, or a surveillance transmission, and the second type of communication is a short-range detect and avoid transmission.

In a third aspect, alone or in combination with one or more of the first and second aspects, allocating the one or more resources for the sidelink communication to be transmitted by the UE comprises semi-statically allocating a first resource pool that includes a first set of resources for the first type of communication or semi-statically allocating a second resource pool that includes a second set of resources for the second type of communication.

In a fourth aspect, alone or in combination with one or more of the first through third aspects, the first set of resources are associated with a first resource configuration having a first quality of service flow criterion, a first transmit power criterion, a first interference coordination criterion, a first power control criterion, and a first resource selection criterion, and the second set of resources are associated with a second resource configuration having a second quality of service flow criterion, a second transmit power criterion, a second interference coordination criterion, a second power control criterion, and a second resource selection criterion.

In a fifth aspect, alone or in combination with one or more of the first through fourth aspects, process 800 includes determining whether a packet that triggers a resource selection is associated with the first type of communication or the second type of communication, wherein allocating the one or more resources comprises selecting the first resource pool or the second resource pool prior to performing the resource selection.

In a sixth aspect, alone or in combination with one or more of the first through fifth aspects, semi-statically allocating the first resource pool or the second resource pool comprises transmitting a radio resource control (RRC) message that allocates the first resource pool or the second resource pool.

In a seventh aspect, alone or in combination with one or more of the first through sixth aspects, the first resource pool or the second resource pool is indicated in a dedicated field of the RRC message.

In an eighth aspect, alone or in combination with one or more of the first through seventh aspects, the first resource pool or the second resource pool is indicated in a quality of service profile or a quality of service flow field of the RRC message.

In a ninth aspect, alone or in combination with one or more of the first through eighth aspects, allocating the one or more resources for the sidelink communication comprises dynamically allocating a resource pool for the first type of communication and the second type of communication.

In a tenth aspect, alone or in combination with one or more of the first through ninth aspects, process 800 includes determining whether a packet that triggers a resource selection is associated with the first type of communication or the second type of communication, wherein allocating the one or more resources comprises selecting a first set of resources based at least in part on the packet being associated with the first type of communication or selecting a second set of resources based at least in part on the packet being associated with the second type of communication.

In an eleventh aspect, alone or in combination with one or more of the first through tenth aspects, process 800 includes transmitting sidelink control information (SCI) that includes an indication of the first set of resources or the second set of resources.

In a twelfth aspect, alone or in combination with one or more of the first through eleventh aspects, the SCI is first stage SCI (SCI-1).

In a thirteenth aspect, alone or in combination with one or more of the first through twelfth aspects, the indication of the first set of resources or the second set of resources is included in a priority field of the SCI-1.

In a fourteenth aspect, alone or in combination with one or more of the first through thirteenth aspects, the indication of the first set of resources or the second set of resources is included in a resource reservation period field of the SCI-1.

In a fifteenth aspect, alone or in combination with one or more of the first through fourteenth aspects, the indication of the first set of resources or the second set of resources is included in a second stage SCI format field of the SCI-1.

In a sixteenth aspect, alone or in combination with one or more of the first through fifteenth aspects, the SCI is second stage SCI (SCI-2).

In a seventeenth aspect, alone or in combination with one or more of the first through sixteenth aspects, the indication of the first set of resources or the second set of resources is included in a cast type indicator field of the SCI-2.

In an eighteenth aspect, alone or in combination with one or more of the first through seventeenth aspects, the indication of the first set of resources or the second set of resources is included in a destination identifier field of the SCI-2.

In a nineteenth aspect, alone or in combination with one or more of the first through eighteenth aspects, the indication of the first set of resources or the second set of resources is included in a quality of service field of the SCI-2.

In a twentieth aspect, alone or in combination with one or more of the first through nineteenth aspects, process 800 includes determining a transmit power for the sidelink communication based at least in part on a priority level of a physical sidelink shared channel transmission and a channel busy ratio range associated with a channel busy ratio measured in a slot.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
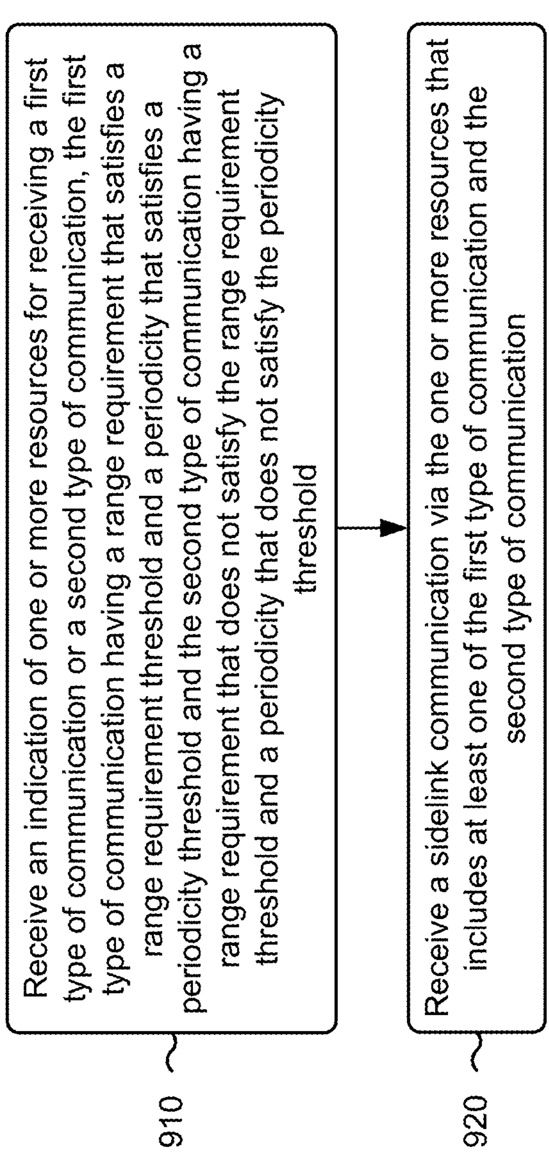
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with user equipment resource allocation.

As shown in FIG. 9, in some aspects, process 900 may include receiving an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold (block 910). For example, the UE (e.g., using reception component 1102 and/or communication manager 1106, depicted in FIG. 11) may receive an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold, as described above.

As further shown in FIG. 9, in some aspects, process 900 may include receiving a sidelink communication via the one or more resources that includes at least one of the first type of communication and the second type of communication (block 920). For example, the UE (e.g., using reception component 1102 and/or communication manager 1106, depicted in FIG. 11) may receive a sidelink communication via the one or more resources that includes at least one of the first type of communication and the second type of communication, as described above.

Process 900 may include additional aspects, such as any single aspect or any combination of aspects described below and/or in connection with one or more other processes described elsewhere herein.

In a first aspect, the UE is an unmanned aerial vehicle.

In a second aspect, alone or in combination with the first aspect, the first type of communication is a broadcast remote identifier transmission, an electronic conspicuity transmission, a long-range detect and avoid transmission, or a surveillance transmission, and the second type of communication is a short-range detect and avoid transmission.

In a third aspect, alone or in combination with one or more of the first and second aspects, receiving the indication of the one or more resources comprises receiving a radio resource control (RRC) message that indicates a first resource pool that includes a first set of resources for the first type of communication or a second resource pool that includes a second set of resources for the second type of communication.

In a fourth aspect, alone or in combination with one or more of the first through third aspects, the first set of resources are associated with a first resource configuration having a first quality of service flow criterion, a first transmit power criterion, a first interference coordination criterion, a first power control criterion, and a first resource selection criterion, and the second set of resources are associated with a second resource configuration having a second quality of service flow criterion, a second transmit power criterion, a second interference coordination criterion, a second power control criterion, and a second resource selection criterion.

In a fifth aspect, alone or in combination with one or more of the first through fourth aspects, the first resource pool or the second resource pool is indicated in a dedicated field of the RRC message.

In a sixth aspect, alone or in combination with one or more of the first through fifth aspects, the first resource pool or the second resource pool is indicated in a quality of service profile or a quality of service flow field of the RRC message.

In a seventh aspect, alone or in combination with one or more of the first through sixth aspects, receiving the indication of the one or more resources comprises receiving sidelink control information (SCI) that indicates a resource pool for the first type of communication and the second type of communication.

In an eighth aspect, alone or in combination with one or more of the first through seventh aspects, the SCI is first stage SCI (SCI-1).

In a ninth aspect, alone or in combination with one or more of the first through eighth aspects, the indication of the first set of resources or the second set of resources is included in a priority field of the SCI-1.

In a tenth aspect, alone or in combination with one or more of the first through ninth aspects, the indication of the first set of resources or the second set of resources is included in a resource reservation period field of the SCI-1.

In an eleventh aspect, alone or in combination with one or more of the first through tenth aspects, the indication of the first set of resources or the second set of resources is included in a second stage SCI format field of the SCI-1.

In a twelfth aspect, alone or in combination with one or more of the first through eleventh aspects, the SCI is second stage SCI (SCI-2).

In a thirteenth aspect, alone or in combination with one or more of the first through twelfth aspects, the indication of the first set of resources or the second set of resources is included in a cast type indicator field of the SCI-2.

In a fourteenth aspect, alone or in combination with one or more of the first through thirteenth aspects, the indication of the first set of resources or the second set of resources is included in a destination identifier field of the SCI-2.

In a fifteenth aspect, alone or in combination with one or more of the first through fourteenth aspects, the indication of the first set of resources or the second set of resources is included in a quality of service field of the SCI-2.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
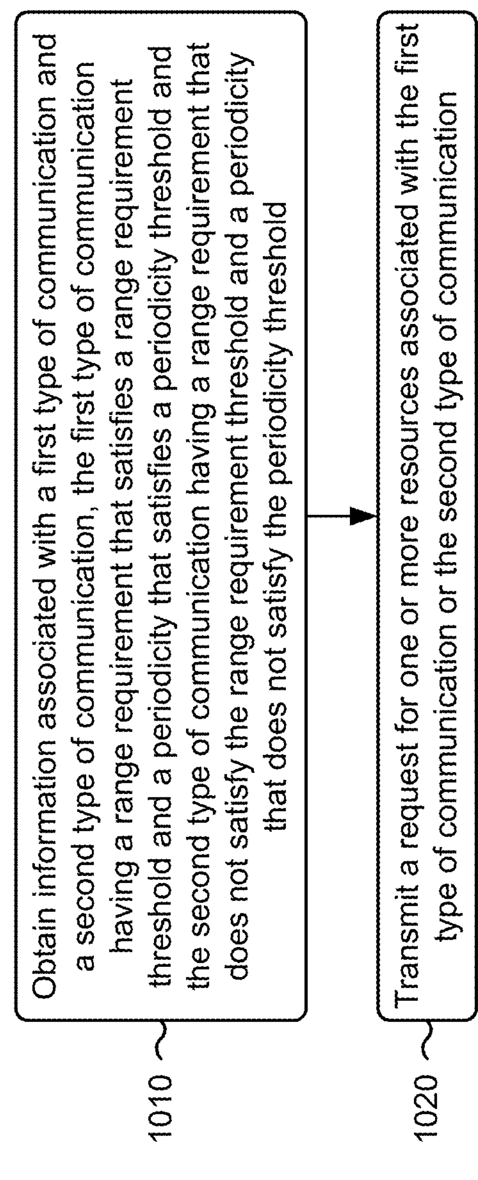
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with user equipment resource allocation.

As shown in FIG. 10, in some aspects, process 1000 may include obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold (block 1010). For example, the UE (e.g., using reception component 1102 and/or communication manager 1106, depicted in FIG. 11) may obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold, as described above.

As further shown in FIG. 10, in some aspects, process 1000 may include transmitting a request for one or more resources associated with the first type of communication or the second type of communication (block 1020). For example, the UE (e.g., using transmission component 1104 and/or communication manager 1106, depicted in FIG. 11) may transmit a request for one or more resources associated with the first type of communication or the second type of communication, as described above.

Process 1000 may include additional aspects, such as any single aspect or any combination of aspects described below and/or in connection with one or more other processes described elsewhere herein.

In a first aspect, the UE is an unmanned aerial vehicle.

In a second aspect, alone or in combination with the first aspect, the first type of communication is a broadcast remote identifier transmission, an electronic conspicuity transmission, a long-range detect and avoid transmission, or a surveillance transmission, and the second type of communication is a short-range detect and avoid transmission.

In a third aspect, alone or in combination with one or more of the first and second aspects, the request for the one or more resources is included in a sidelink cast type parameter.

In a fourth aspect, alone or in combination with one or more of the first through third aspects, the request for the one or more resources is included in a sidelink quality of service information list parameter.

In a fifth aspect, alone or in combination with one or more of the first through fourth aspects, the request for the one or more resources is included in a sidelink destination identity parameter.

In a sixth aspect, alone or in combination with one or more of the first through fifth aspects, the request for the one or more resources is included in a dedicated radio resource control parameter.

In a seventh aspect, alone or in combination with one or more of the first through sixth aspects, the request for the one or more resources is a request for a configured grant for the one or more resources.

In an eighth aspect, alone or in combination with one or more of the first through seventh aspects, the request for the configured grant for the one or more resources is included in a sidelink quality of service flow identity parameter.

In a ninth aspect, alone or in combination with one or more of the first through eighth aspects, the request for the configured grant for the one or more resources is included in a dedicated radio resource control parameter.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
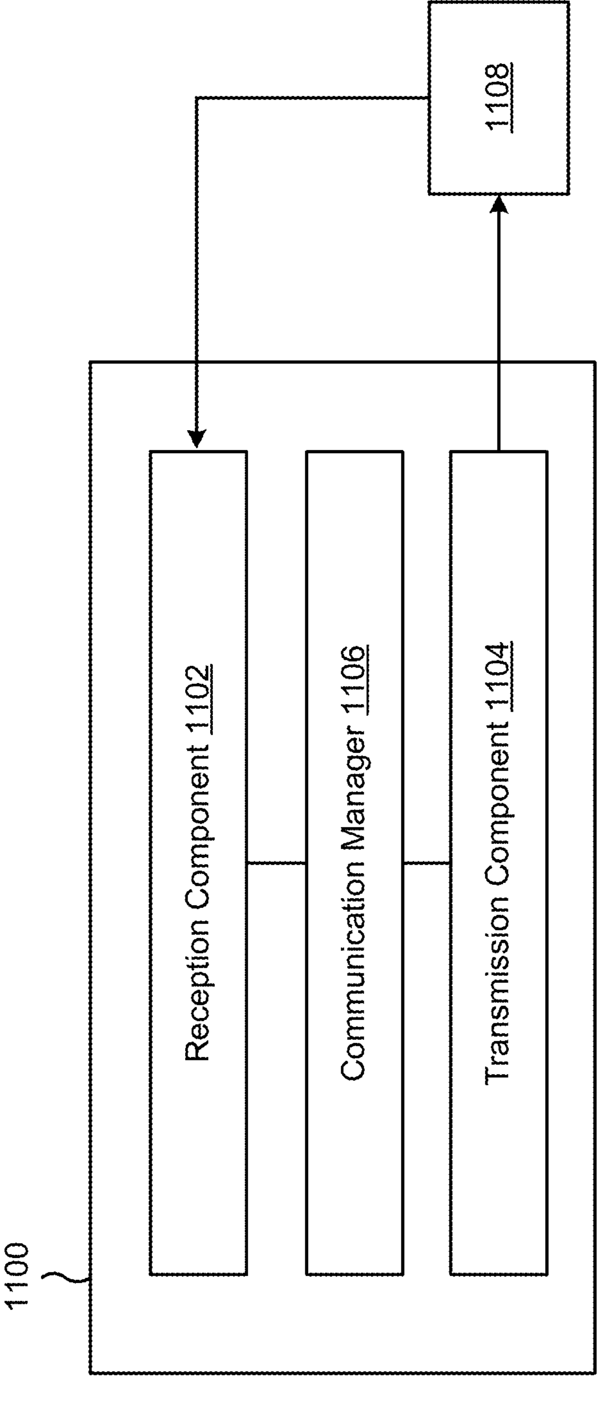
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6-7. Additionally, or alternatively, the apparatus 1100 may be configured to perform one or more processes described herein, such as process 800 of FIG. 8, process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The communication manager 1106 may allocate one or more resources for a sidelink communication to be transmitted by the UE based at least in part on the information.

The communication manager 1106 may determine whether a packet that triggers a resource selection is associated with the first type of communication or the second type of communication, wherein allocating the one or more resources comprises selecting the first resource pool or the second resource pool prior to performing the resource selection. The communication manager 1106 may determine whether a packet that triggers a resource selection is associated with the first type of communication or the second type of communication, wherein allocating the one or more resources comprises selecting a first set of resources based at least in part on the packet being associated with the first type of communication or selecting a second set of resources based at least in part on the packet being associated with the second type of communication. The transmission component 1104 may transmit sidelink control information (SCI) that includes an indication of the first set of resources or the second set of resources. The communication manager 1106 may determine a transmit power for the sidelink communication based at least in part on a priority level of a physical sidelink shared channel transmission and a channel busy ratio range associated with a channel busy ratio measured in a slot.

The reception component 1102 may receive an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The reception component 1102 may receive a sidelink communication via the one or more resources that includes at least one of the first type of communication and the second type of communication.

The reception component 1102 may obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold. The transmission component 1104 may transmit a request for one or more resources associated with the first type of communication or the second type of communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and allocating one or more resources for a sidelink communication to be transmitted by the UE based at least in part on the information.

Aspect 2: The method of Aspect 1, wherein the UE is an unmanned aerial vehicle.

Aspect 3: The method of any of Aspects 1-2, wherein the first type of communication is a broadcast remote identifier transmission, an electronic conspicuity transmission, a long-range detect and avoid transmission, or a surveillance transmission, and the second type of communication is a short-range detect and avoid transmission.

Aspect 4: The method of any of Aspects 1-3, wherein allocating the one or more resources for the sidelink communication to be transmitted by the UE comprises semi-statically allocating a first resource pool that includes a first set of resources for the first type of communication or semi-statically allocating a second resource pool that includes a second set of resources for the second type of communication.

Aspect 5: The method of Aspect 4, wherein the first set of resources are associated with a first resource configuration having a first quality of service flow criterion, a first transmit power criterion, a first interference coordination criterion, a first power control criterion, and a first resource selection criterion, and the second set of resources are associated with a second resource configuration having a second quality of service flow criterion, a second transmit power criterion, a second interference coordination criterion, a second power control criterion, and a second resource selection criterion.

Aspect 6: The method of Aspect 4, further comprising determining whether a packet that triggers a resource selection is associated with the first type of communication or the second type of communication, wherein allocating the one or more resources comprises selecting the first resource pool or the second resource pool prior to performing the resource selection.

Aspect 7: The method of Aspect 4, wherein semi-statically allocating the first resource pool or the second resource pool comprises transmitting a radio resource control (RRC) message that allocates the first resource pool or the second resource pool.

Aspect 8: The method of Aspect 7, wherein the first resource pool or the second resource pool is indicated in a dedicated field of the RRC message.

Aspect 9: The method of Aspect 7, wherein the first resource pool or the second resource pool is indicated in a quality of service profile or a quality of service flow field of the RRC message.

Aspect 10: The method of any of Aspects 1-9, wherein allocating the one or more resources for the sidelink communication comprises dynamically allocating a resource pool for the first type of communication and the second type of communication.

Aspect 11: The method of Aspect 10, further comprising further comprising determining whether a packet that triggers a resource selection is associated with the first type of communication or the second type of communication, wherein allocating the one or more resources comprises selecting a first set of resources based at least in part on the packet being associated with the first type of communication or selecting a second set of resources based at least in part on the packet being associated with the second type of communication.

Aspect 12: The method of Aspect 11, further comprising transmitting sidelink control information (SCI) that includes an indication of the first set of resources or the second set of resources.

Aspect 13: The method of Aspect 12, wherein the SCI is first stage SCI (SCI-1).

Aspect 14: The method of Aspect 13, wherein the indication of the first set of resources or the second set of resources is included in a priority field of the SCI-1.

Aspect 15: The method of Aspect 13, wherein the indication of the first set of resources or the second set of resources is included in a resource reservation period field of the SCI-1.

Aspect 16: The method of Aspect 13, wherein the indication of the first set of resources or the second set of resources is included in a second stage SCI format field of the SCI-1.

Aspect 17: The method of Aspect 12, wherein the SCI is second stage SCI (SCI-2).

Aspect 18: The method of Aspect 17, wherein the indication of the first set of resources or the second set of resources is included in a cast type indicator field of the SCI-2.

Aspect 19: The method of Aspect 17, wherein the indication of the first set of resources or the second set of resources is included in a destination identifier field of the SCI-2.

Aspect 20: The method of Aspect 17, wherein the indication of the first set of resources or the second set of resources is included in a quality of service field of the SCI-2.

Aspect 21: The method of Aspect 10, further comprising determining a transmit power for the sidelink communication based at least in part on a priority level of a physical sidelink shared channel transmission and a channel busy ratio range associated with a channel busy ratio measured in a slot.

Aspect 22: A method of wireless communication performed by a user equipment (UE), comprising: receiving an indication of one or more resources for receiving a first type of communication or a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and receiving a sidelink communication via the one or more resources that includes at least one of the first type of communication and the second type of communication. Aspect 23: The method of Aspect 22, wherein the UE is an unmanned aerial vehicle.

Aspect 24: The method of any of Aspects 22-23, wherein the first type of communication is a broadcast remote identifier transmission, an electronic conspicuity transmission, a long-range detect and avoid transmission, or a surveillance transmission, and the second type of communication is a short-range detect and avoid transmission.

Aspect 25: The method of any of Aspects 22-24, wherein receiving the indication of the one or more resources comprises receiving a radio resource control (RRC) message that indicates a first resource pool that includes a first set of resources for the first type of communication or a second resource pool that includes a second set of resources for the second type of communication.

Aspect 26: The method of Aspect 25, wherein the first set of resources are associated with a first resource configuration having a first quality of service flow criterion, a first transmit power criterion, a first interference coordination criterion, a first power control criterion, and a first resource selection criterion, and the second set of resources are associated with a second resource configuration having a second quality of service flow criterion, a second transmit power criterion, a second interference coordination criterion, a second power control criterion, and a second resource selection criterion.

Aspect 27: The method of Aspect 25, wherein the first resource pool or the second resource pool is indicated in a dedicated field of the RRC message.

Aspect 28: The method of Aspect 25, wherein the first resource pool or the second resource pool is indicated in a quality of service profile or a quality of service flow field of the RRC message.

Aspect 29: The method of any of Aspects 22-28, wherein receiving the indication of the one or more resources comprises receiving sidelink control information (SCI) that indicates a resource pool for the first type of communication and the second type of communication.

Aspect 30: The method of Aspect 29, wherein the SCI is first stage SCI (SCI-1).

Aspect 31: The method of Aspect 30, wherein the indication of the first set of resources or the second set of resources is included in a priority field of the SCI-1.

Aspect 32: The method of Aspect 30, wherein the indication of the first set of resources or the second set of resources is included in a resource reservation period field of the SCI-1.

Aspect 33: The method of Aspect 30, wherein the indication of the first set of resources or the second set of resources is included in a second stage SCI format field of the SCI-1.

Aspect 34: The method of Aspect 29, wherein the SCI is second stage SCI (SCI-2).

Aspect 35: The method of Aspect 34, wherein the indication of the first set of resources or the second set of resources is included in a cast type indicator field of the SCI-2.

Aspect 36: The method of Aspect 34, wherein the indication of the first set of resources or the second set of resources is included in a destination identifier field of the SCI-2.

Aspect 37: The method of Aspect 34, wherein the indication of the first set of resources or the second set of resources is included in a quality of service field of the SCI-2.

Aspect 38: A method of wireless communication performed by a user equipment (UE), comprising: obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and transmitting a request for one or more resources associated with the first type of communication or the second type of communication.

Aspect 39: The method of Aspect 38, wherein the UE is an unmanned aerial vehicle.

Aspect 40: The method of any of Aspects 38-39, wherein the first type of communication is a broadcast remote identifier transmission, an electronic conspicuity transmission, a long-range detect and avoid transmission, or a surveillance transmission, and the second type of communication is a short-range detect and avoid transmission.

Aspect 41: The method of any of Aspects 38-40, wherein the request for the one or more resources is included in a sidelink cast type parameter.

Aspect 42: The method of any of Aspects 38-41, wherein the request for the one or more resources is included in a sidelink quality of service information list parameter.

Aspect 43: The method of any of Aspects 38-42, wherein the request for the one or more resources is included in a sidelink destination identity parameter.

Aspect 44: The method of any of Aspects 38-43, wherein the request for the one or more resources is included in a dedicated radio resource control parameter.

Aspect 45: The method of any of Aspects 38-44, wherein the request for the one or more resources is a request for a configured grant for the one or more resources.

Aspect 46: The method of Aspect 45, wherein the request for the configured grant for the one or more resources is included in a sidelink quality of service flow identity parameter.

Aspect 47: The method of Aspect 45, wherein the request for the configured grant for the one or more resources is included in a dedicated radio resource control parameter.

Aspect 48: An apparatus for wireless communication at a device, comprising a processor: memory coupled with the processor; and instructions stored in the memory and executable by the processor to cause the apparatus to perform the method of one or more of Aspects 1-47.

Aspect 49: A device for wireless communication, comprising a memory and one or more processors coupled to the memory, the one or more processors configured to perform the method of one or more of Aspects 1-47.

Aspect 50: An apparatus for wireless communication, comprising at least one means for performing the method of one or more of Aspects 1-47.

Aspect 51: A non-transitory computer-readable medium storing code for wireless communication, the code comprising instructions executable by a processor to perform the method of one or more of Aspects 1-47.

Aspect 52: A non-transitory computer-readable medium storing a set of instructions for wireless communication, the set of instructions comprising one or more instructions that, when executed by one or more processors of a device, cause the device to perform the method of one or more of Aspects 1-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and semi-statically allocate at least one of a first resource pool, that includes a first set of resources for the first type of communication, or a second resource pool, that includes a second set of resources for the second type of communication, for a sidelink communication, the first set of resources associated with a first resource configuration having a first quality of service flow criterion and the second set of resources associated with a second resource configuration having a second quality of service flow criterion.

2. The apparatus of claim 1, wherein the UE is an unmanned aerial vehicle.

3. The apparatus of claim 1, wherein the first type of communication is a broadcast remote identifier transmission, an electronic conspicuity transmission, a long-range detect and avoid transmission, or a surveillance transmission, and the second type of communication is a short-range detect and avoid transmission.

4. The apparatus of claim 1, wherein the first resource configuration has a first transmit power criterion, and the second resource configuration has a second transmit power criterion.

5. The apparatus of claim 1, wherein the one or more processors are further configured to determine whether a packet for sidelink transmission that triggers a resource selection is associated with the first type of communication or the second type of communication; and select the first resource pool or the second resource pool prior to performing the resource selection.

6. The apparatus of claim 1, wherein the one or more processors are further configured to transmit a radio resource control (RRC) message that allocates the first resource pool or the second resource pool.

7. The apparatus of claim 6, wherein the first resource pool or the second resource pool is indicated in a dedicated field of the RRC message.

8. The apparatus of claim 6, wherein the first resource pool or the second resource pool is indicated in a quality of service profile or a quality of service flow field of the RRC message.

9. The apparatus of claim 1, wherein the one or more processors are further configured to transmit sidelink control information (SCI) that includes an indication of the first set of resources or the second set of resources.

10. The apparatus of claim 9, wherein the SCI is first stage SCI (SCI-1).

11. The apparatus of claim 10, wherein the indication of the first set of resources or the second set of resources is included in a priority field of the SCI-1, in a resource reservation period field of the SCI-1, or in a second stage SCI format field of the SCI-1.

12. The apparatus of claim 9, wherein the SCI is second stage SCI (SCI-2).

13. The apparatus of claim 12, wherein the indication of the first set of resources or the second set of resources is included in a cast type indicator field of the SCI-2, in a destination identifier field of the SCI-2, or in a quality of service field of the SCI-2.

14. The apparatus of claim 1, wherein the one or more processors are further configured to determine a transmit power for the sidelink communication based at least in part on a priority level of a physical sidelink shared channel transmission and a channel busy ratio range associated with a channel busy ratio measured in a slot.

15. The apparatus of claim 1, wherein the first resource configuration has a first interference coordination criterion and the second resource configuration has a second interference coordination criterion.

16. An apparatus for wireless communication at a user equipment (UE), comprising:

one or more memories; and one or more processors, coupled to the one or more memories, configured to:

receive an indication of a first resource pool, including a first set of resources for receiving a first type of communication, or a second resource pool, including a second set of resources for receiving a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold, and the first set of resources associated with a first resource configuration having a first quality of service flow criterion, and the second set of resources associated with a second resource configuration having a second quality of service flow criterion; and receive a sidelink communication via the first resource pool or the second resource pool, wherein the sidelink communication includes at least one of the first type of communication and the second type of communication.

17. The apparatus of claim 16, wherein the UE is an unmanned aerial vehicle, and wherein the first type of communication is a broadcast remote identifier transmission, an electronic conspicuity transmission, a long-range detect and avoid transmission, or a surveillance transmission, and the second type of communication is a short-range detect and avoid transmission.

18. The apparatus of claim 16, wherein the one or more processors, to receive the indication of the one or more resources, are configured to receive a radio resource control (RRC) message that indicates the first resource pool or the second resource pool.

19. The apparatus of claim 16, wherein the one or more processors, to receive the indication of the one or more resources, are configured to receive sidelink control information (SCI) that includes an indication of whether the sidelink communication corresponds to the first type of communication or the second type of communication.

20. An apparatus for wireless communication at a user equipment (UE), comprising:

one or more memories; and one or more processors, coupled to the one or more memories, configured to:

obtain information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and transmit a request associated with a first resource pool, including a first set of resources for the first type of communication, or a second resource pool, including a second set of resources for the second type of communication, the first set of resources associated with a first resource configuration having a first quality of service flow criterion and the second set of resources associated with a second resource configuration having a second quality of service flow criterion.

21. The apparatus of claim 20, wherein the UE is an unmanned aerial vehicle, and wherein the first type of communication is a broadcast remote identifier transmission, an electronic conspicuity transmission, a long-range detect and avoid transmission, or a surveillance transmission, and the second type of communication is a short-range detect and avoid transmission.

22. The apparatus of claim 20, wherein the request for the first resource pool or the second resource pool is included in a sidelink cast type parameter.

23. The apparatus of claim 20, wherein the request for the first resource pool or the second resource pool is included in a sidelink quality of service information list parameter.

24. The apparatus of claim 20, wherein the request for the first resource pool or the second resource pool is included in a sidelink destination identity parameter.

25. The apparatus of claim 20, wherein the request for the first resource pool or the second resource pool is included in a dedicated radio resource control parameter.

26. The apparatus of claim 20, wherein the request for the first resource pool or the second resource pool is a request for a configured grant for the one or more resources.

27. The apparatus of claim 26, wherein the request for the configured grant for the first resource pool or the second resource pool is included in a sidelink quality of service flow identity parameter or in a dedicated radio resource control parameter.

28. A method of wireless communication performed by a user equipment (UE), comprising:

obtaining information associated with a first type of communication and a second type of communication, the first type of communication having a range requirement that satisfies a range requirement threshold and a periodicity that satisfies a periodicity threshold and the second type of communication having a range requirement that does not satisfy the range requirement threshold and a periodicity that does not satisfy the periodicity threshold; and semi-statically allocating at least one of a first resource pool, that includes a first set of resources for the first type of communication, or a second resource pool, that includes a second set of resources for the second type of communication, for a sidelink communication, the first set of resources associated with a first resource configuration having a first quality of service flow criterion and the second set of resources associated with a second resource configuration having a second quality of service flow criterion.

29. The method of claim 28, wherein the first resource configuration has a first transmit power criterion, and the second resource configuration has a second transmit power criterion.

30. The method of claim 28, wherein the first resource configuration has a first interference coordination criterion, and the second resource configuration has a second interference coordination criterion.

* * * * *